(12) United States Patent
Miyano

(10) Patent No.: US 7,502,182 B2
(45) Date of Patent: Mar. 10, 2009

(54) OBJECTIVE LENS FOR ENDOSCOPE

(75) Inventor: Hitoshi Miyano, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/705,434

(22) Filed: Feb. 13, 2007

(65) Prior Publication Data
US 2007/0188892 A1   Aug. 16, 2007

(30) Foreign Application Priority Data

| Feb. 14, 2006 | (JP) | ............................ P2006-036582 |
| May 19, 2006 | (JP) | ............................ P2006-140242 |

(51) Int. Cl.
*G02B 9/04* (2006.01)
*G02B 21/02* (2006.01)
*G02B 23/24* (2006.01)

(52) U.S. Cl. .................... 359/793; 359/661; 359/434

(58) Field of Classification Search ............... 359/434, 359/435, 656, 661, 793; 600/162
See application file for complete search history.

(56) References Cited

FOREIGN PATENT DOCUMENTS

| JP | 2002-365535 A | | 12/2002 |
| JP | 2005-148508 A | | 6/2005 |
| JP | 2005148508 A | * | 6/2005 |

* cited by examiner

*Primary Examiner*—William C Choi
(74) *Attorney, Agent, or Firm*—Birch, Stewart, Kolasch & Birch, LLP.

(57) ABSTRACT

An endoscope objective lens is provided and has a front-group divergent lens system, an aperture stop, and a rear-group convergent lens system in this order from the object side. The back focal length Bf of the whole system is longer than 2.5 times the combined focal length f of the whole system. The rear-group convergent lens system includes a cemented lens. The endoscope objective lens satisfies the specific formula.

2 Claims, 17 Drawing Sheets

FIG. 5

LENS DATA OF EXAMPLE 1

| Si (SURFACE) | Ri (RADIUS OF CURVATURE) | Di (SURFACE INTERVAL) | ndj (REFRACTIVE INDEX) | νdj (ABBE NUMBER) |
|---|---|---|---|---|
| 1 | ∞ | 0.2492 | 1.88300 | 40.9 |
| 2 | 0.4984 | 0.5831 | | |
| 3 | STOP | 0.0930 | | |
| 4 | -0.7007 | 0.5283 | 1.71300 | 53.9 |
| 5 | -0.6419 | 0.0997 | | |
| 6 | 1.5889 | 0.5981 | 1.62041 | 60.3 |
| 7 | -0.5781 | 0.2492 | 1.92286 | 18.9 |
| 8 | -1.1712 | 0.6092 | | |
| 9 | ∞ | 1.5000 | 1.55920 | 53.9 |
| 10 (IMG) | ∞ | | | |

LENS DATA OF EXAMPLE 2

| Si (SURFACE) | Ri (RADIUS OF CURVATURE) | Di (SURFACE INTERVAL) | ndj (REFRACTIVE INDEX) | νdj (ABBE NUMBER) |
|---|---|---|---|---|
| 1 | ∞ | 0.2499 | 1.88300 | 40.9 |
| 2 | 0.4998 | 0.6252 | | |
| 3 | STOP | 0.0913 | | |
| 4 | -0.7159 | 0.5298 | 1.71300 | 53.9 |
| 5 | -0.7357 | 0.1000 | | |
| 6 | 1.1582 | 0.2599 | 1.90680 | 21.2 |
| 7 | 0.5798 | 0.5898 | 1.61800 | 63.4 |
| 8 | -1.3062 | 0.6066 | | |
| 9 | ∞ | 1.5000 | 1.55920 | 53.9 |
| 10 (IMG) | ∞ | | | |

LENS DATA OF EXAMPLE 3

| Si (SURFACE) | Ri (RADIUS OF CURVATURE) | Di (SURFACE INTERVAL) | ndj (REFRACTIVE INDEX) | υdj (ABBE NUMBER) |
|---|---|---|---|---|
| 1 | ∞ | 0.2486 | 1.88300 | 40.9 |
| 2 | 0.4972 | 0.6004 | | |
| 3 | STOP | 0.0910 | | |
| 4 | -0.7114 | 0.5271 | 1.71300 | 53.9 |
| 5 | -0.6362 | 0.0994 | | |
| 6 | 1.7871 | 0.5967 | 1.59240 | 68.3 |
| 7 | -0.5768 | 0.2486 | 1.92286 | 18.9 |
| 8 | -1.0701 | 0.7370 | | |
| 9 | ∞ | 1.5000 | 1.55920 | 53.9 |
| 10 (IMG) | ∞ | | | |

L1: surfaces 1–2
L2: surfaces 4–5
L3 (L4): surfaces 6–8
GP: surface 9

FIG. 8

LENS DATA OF EXAMPLE 4

| Si (SURFACE) | Ri (RADIUS OF CURVATURE) | Di (SURFACE INTERVAL) | ndj (REFRACTIVE INDEX) | νdj (ABBE NUMBER) |
|---|---|---|---|---|
| 1 | ∞ | 0.1915 | 1.88300 | 40.9 |
| 2 | 0.4110 | 0.7244 | | |
| 3 | STOP | 0.0520 | | |
| 4 | -2.4873 | 0.4468 | 1.71300 | 53.9 |
| 5 | -0.7736 | 0.1149 | | |
| 6 | 1.7769 | 0.5808 | 1.62041 | 60.3 |
| 7 | -0.5693 | 0.2234 | 1.92286 | 18.9 |
| 8 | -1.2733 | 0.5167 | | |
| 9 | ∞ | 1.5000 | 1.55920 | 53.9 |
| 10 (IMG) | ∞ | | | |

L1: surfaces 1–2
L2: surfaces 4–5
L3 (L4): surfaces 6–8
GP: surface 9

FIG. 9

| | VALUES OF PARAMETERS RELATING TO FORMULAE | | | | | |
|---|---|---|---|---|---|---|
| | EXAMPLE 1 | EXAMPLE 2 | EXAMPLE 3 | EXAMPLE 4 | COMPARATIVE EXAMPLE |
| IMAGE SIZE | φ0.8mm | φ0.8mm | φ0.8mm | φ0.8mm | φ0.8mm |
| DISTANCE TO OBJECT | 8.0mm | 8.0mm | 8.0mm | 8.0mm | 8.0mm |
| ANGLE OF VIEW | 104° 27' | 102° 49' | 102° 32' | 102° 49' | 103° 39' |
| Bf | 3.083f | 3.078f | 3.188f | 2.897f | 3.246f |
| LATERAL COLOR AT MAXIMUM ANGLE OF VIEW ((F-LINE)-(C-LINE)) | -3.0μm | -4.1μm | -2.5μm | -3.5μm | -5.6μm |
| FORMULA (1) $\|\nu_3 - \nu_4\| \times \dfrac{f^2}{\|R_A\| \cdot (Bf + D_A/n_4)}$ | 10.7 | 9.6 | 12.4 | 11.6 | 6.3 |
| FORMULA (2) | 18.9 | 21.2 | 18.9 | 18.9 | 25.4 |

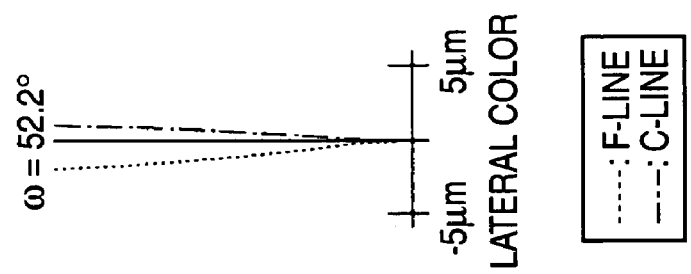
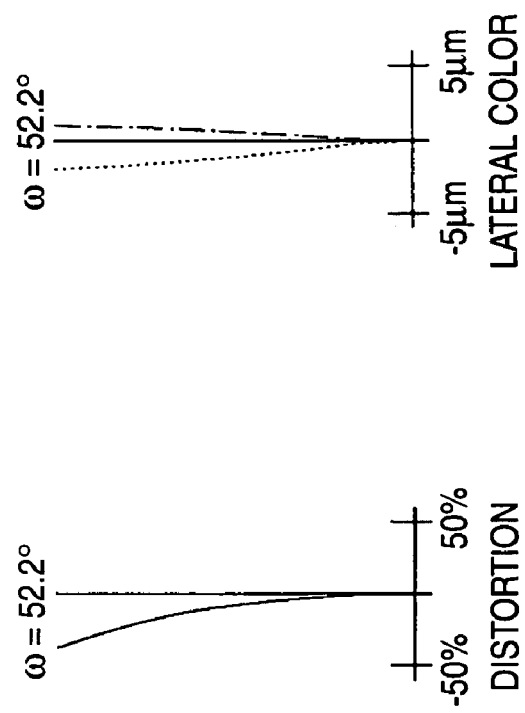
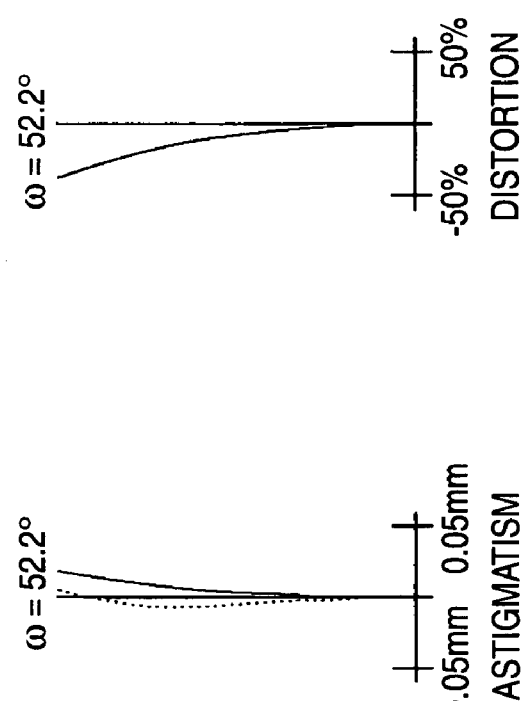
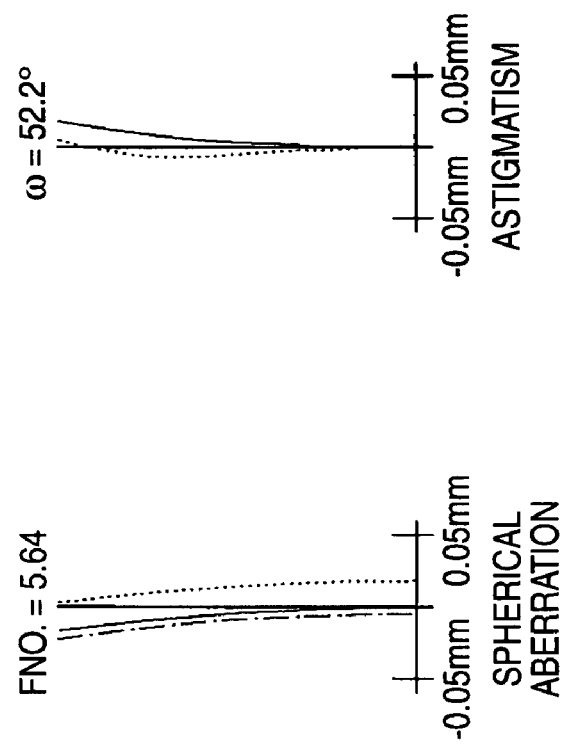
FIG. 10 (A)   FIG. 10 (B)   FIG. 10 (C)   FIG. 10 (D)

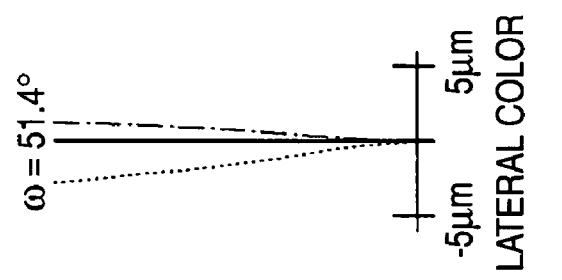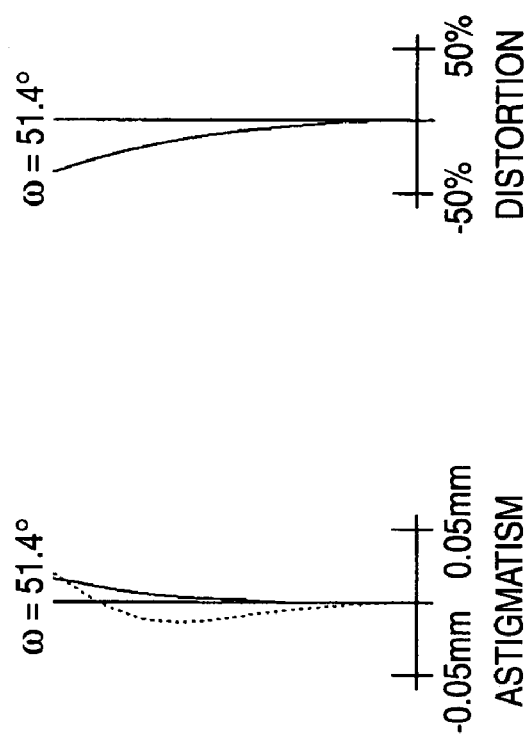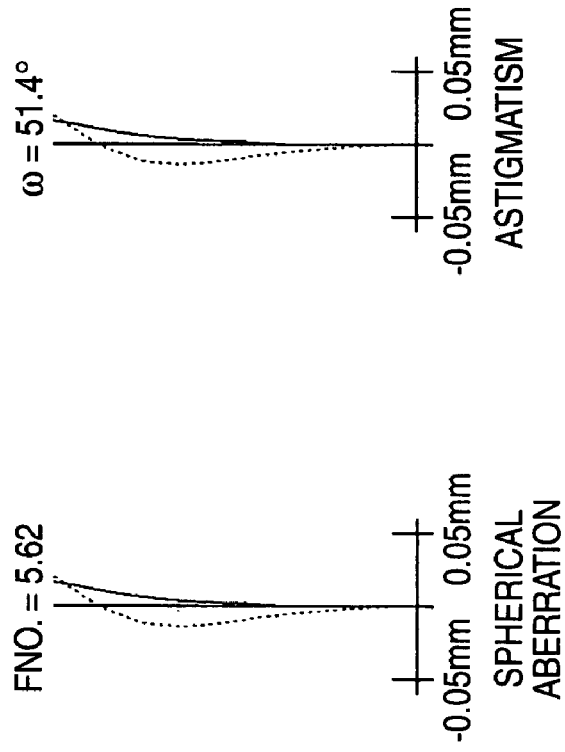
FIG. 11 (A)  FIG. 11 (B)  FIG. 11 (C)  FIG. 11 (D)

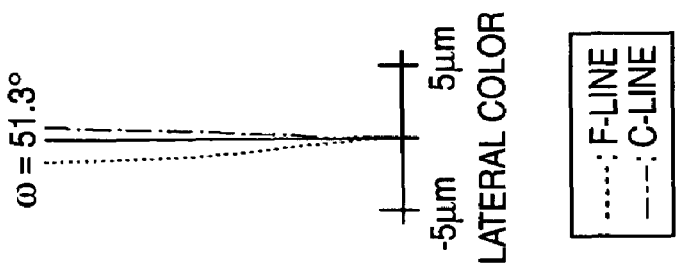
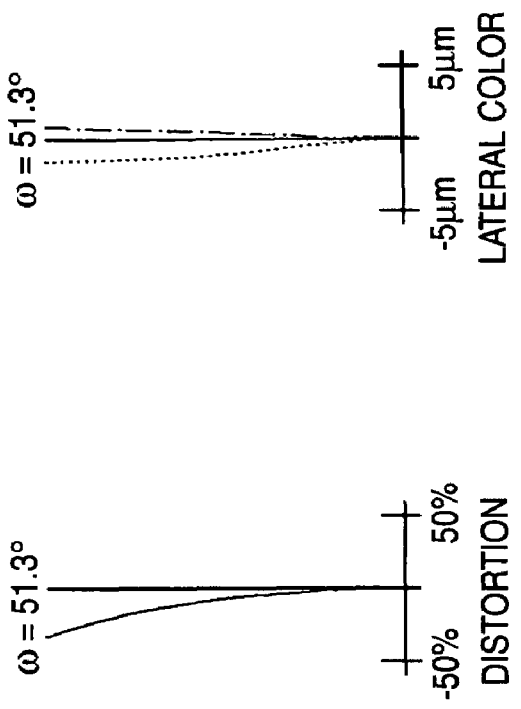
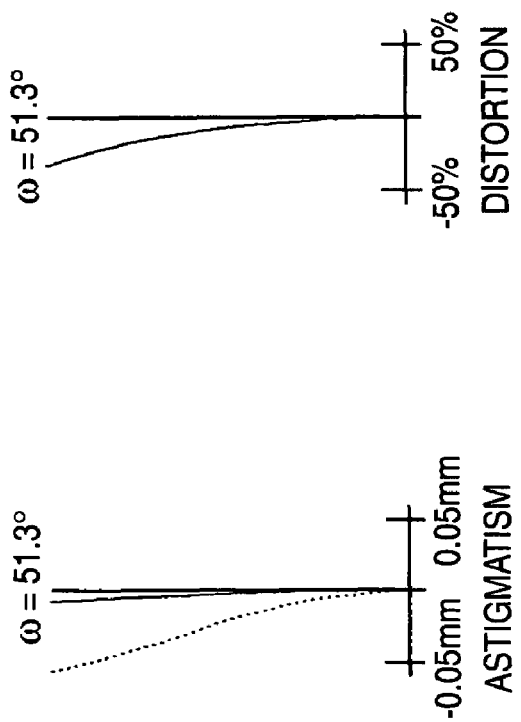
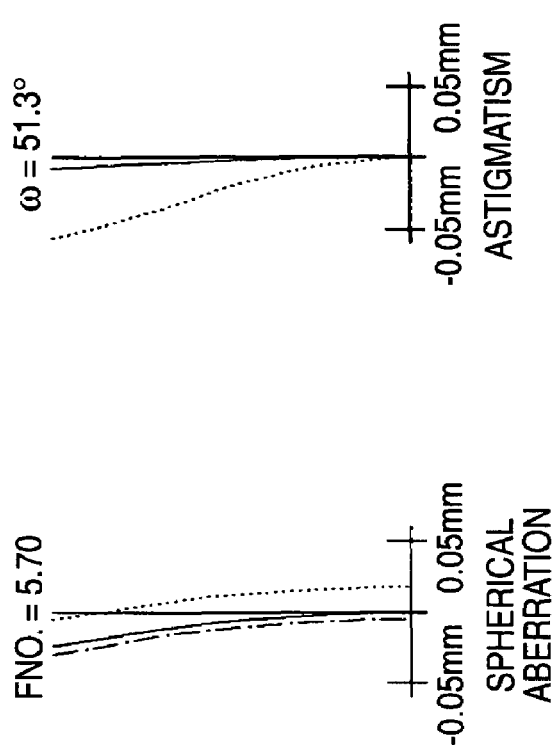

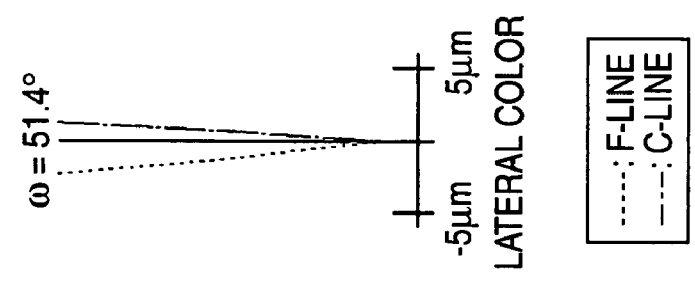
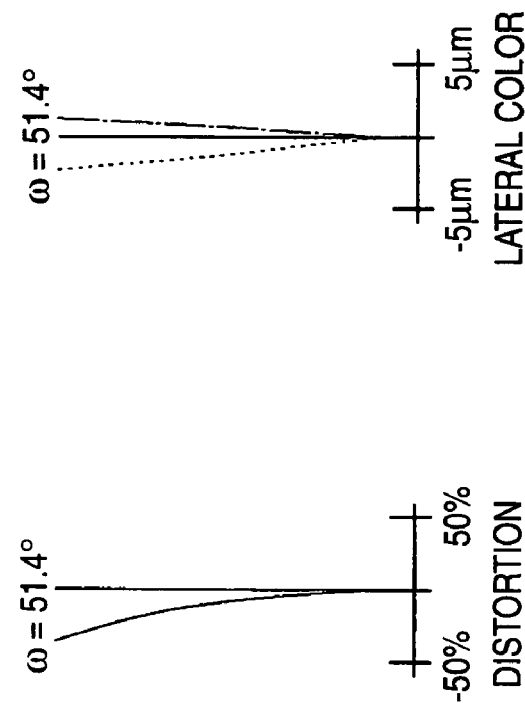
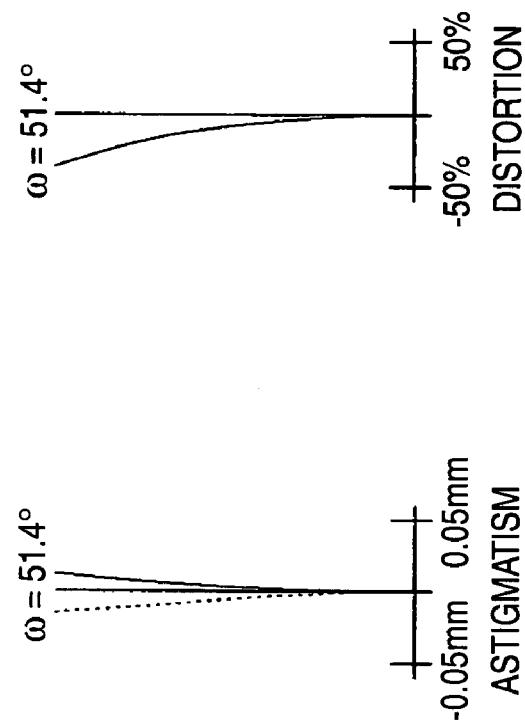
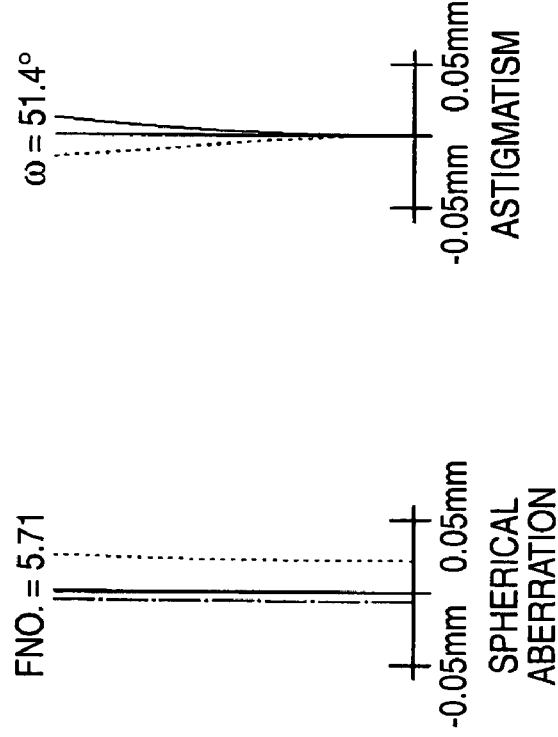

FIG. 15

LENS DATA OF COMPARATIVE EXAMPLE

| Si (SURFACE) | Ri (RADIUS OF CURVATURE) | Di (SURFACE INTERVAL) | ndj (REFRACTIVE INDEX) | νdj (ABBE NUMBER) |
|---|---|---|---|---|
| 1 | ∞ | 0.2209 | 1.88300 | 40.9 |
| 2 | 0.3711 | 0.6725 | | |
| 3 | STOP | 0.0666 | | |
| 4 | -1.4986 | 0.5743 | 1.71300 | 53.9 |
| 5 | -0.7914 | 0.0884 | | |
| 6 | 1.8908 | 0.6671 | 1.71300 | 53.9 |
| 7 | -0.6212 | 0.2651 | 1.80518 | 25.4 |
| 8 | -2.4437 | 0.7275 | | |
| 9 | ∞ | 1.5000 | 1.55920 | 53.9 |
| 10 (IMG) | ∞ | | | |

L1: surfaces 1–2
L2: surfaces 4–5
L3 (L4): surfaces 6–8
GP: surface 9

OBJECTIVE LENS FOR ENDOSCOPE

BACKGROUND OF THE INVENTION

1. Field of the Invention

The present invention relates to an objective lens provided in the tip portion of an endoscope. More particularly, the invention relates to an endoscope objective lens capable of being applied to an optical system in which the back focal length is long enough to allow an optical path-changing prism to be disposed on the image side.

2. Description of Related Art

Endoscopes are known in which a solid-state imaging device such as a CCD (charge-coupled device) is provided in the tip portion so as to be parallel with the longitudinal direction. FIG. 17 outlines an objective optical system of such an endoscope. As shown in FIG. 17, a solid-state imaging device 200 is disposed in the tip portion of the endoscope so as to be parallel with the axial direction (longitudinal direction) Z. An optical path-changing prism 102 is inserted between an objective lens 100 and the solid-state imaging device 200 via a cover glass 101. The optical axis Z1 of the objective lens 100 is bent by the optical path-changing prism 102 by about 90° so as to be directed to the solid-state imaging device 200. The size of the optical path-changing prism 102 is determined by an image size, and the length of the space between the last surface of the objective lens 100 and an image forming position P where the optical path-changing prism 102 is to be inserted should be sufficiently long (this length is approximately equal to the back focal length). This requires an objective lens whose back focal length is long relative to the focal length of the whole system. However, to meet the wide angle requirement, the focal lengths of endoscope objective lenses tend to decrease even for the same image size, which makes it difficult to obtain a sufficiently long back focal length. In this connection, an endoscope objective lens having a 3-group/4-lens structure whose back focal length is sufficiently longer than the combined focal length f of the whole system (JP-A-2005-148508).

On the other hand, to increase the depth of field, many endoscope objective lenses have a large (i.e., dark) F number, in which case neither the spherical aberration nor the coma aberration is an important factor to determining image quality and the lateral color is a great factor to cause image quality deterioration. In particular, in recent years, with the density increase of solid-state imaging devices and the increase in the number of pixels, it has come to be necessary to correct for the lateral color sufficiently. To correct for the lateral color, it is preferable to dispose an optical member for the correction of lateral color at a position that is distant from the stop. In particular, on the image side of the stop, the optical member for the correction of lateral color becomes more effective as it is disposed closer to the image forming surface. However, in lens systems having a long back focal length, the optical member is not disposed close to the image forming surface and hence it is not easy to correct for the lateral color. Although the endoscope objective lens described in JP-A-2005-148508 has a sufficiently long back focal length, it still has room for improvement in terms of the correction of lateral color.

SUMMARY OF THE INVENTION

An object of an illustrative, non-limiting embodiment of the invention is to provide an objective lens which can correct for the lateral color satisfactorily while the back focal length is made longer.

According to an aspect of the invention, there is provided an objective lens comprising: in order from an object side of the objective lens, a front-group divergent lens system comprising a first lens, the first lens having a concave surface on an image side thereof; an aperture stop; and a rear-group convergent lens system comprising a second lens, a third lens and a fourth lens in this order from the object side, wherein the second lens is a positive meniscus lens having a convex surface on the image side thereof, the third and fourth lenses comprises a cemented lens, one of the third and fourth lenses is a positive lens, and the other of the third and fourth lenses is a negative lens. The objective lens has a back focal length longer than 2.5 times a combined focal length of the objective lens, and the objective lens satisfies formula (1):

$$|v_3 - v_4| \times f^2 / \{|R_A| \cdot (Bf + D_A/n_4)\} \geq 9$$

wherein f represents the combined focal length of the objective lens, Bf represents the back focal length of the objective lens, $v_3$ represents an Abbe number of the third lens, $v_4$ represents an Abbe number of the fourth lens, $R_A$ represents a radius of curvature of an interface between the third and fourth lenses, $D_A$ represents a center thickness of the fourth lens, and $n_4$ represents a refractive index of the fourth lens.

In the objective lens, since the cemented lens is disposed on the image side as an optical member for correction of lateral color and the formula (1) is satisfied for the cemented lens, the lateral color is corrected for satisfactorily while the back focal length is made long enough to allow an optical path-changing prism to be inserted on the image side.

It is preferable that the objective lens satisfies formula (2):

$$v_- < 22$$

wherein $v_-$ represents an Abbe number of the negative lens of the cemented lens. This makes it even easier to correct for the lateral color.

BRIEF DESCRIPTION OF THE DRAWINGS

The features of the invention will appear more fully upon consideration of the exemplary embodiment of the invention, which are schematically set forth in the drawings, in which:

FIG. 5 shows lens data of the endoscope objective lens according to Example 1 of the invention;

FIG. 6 shows lens data of the endoscope objective lens according to Example 2 of the invention;

FIG. 7 shows lens data of the endoscope objective lens according to Example 3 of the invention;

FIG. 8 shows lens data of the endoscope objective lens according to Example 4 of the invention;

FIG. 9 shows other various data of the Examples together;

FIG. 10 is aberration diagrams showing various aberrations of the endoscope objective lens according to Example 1 of the invention; FIGS. 10(A)-10(D) show the spherical aberration, astigmatism, distortion, and lateral color, respectively;

FIG. 11 is aberration diagrams showing various aberrations of the endoscope objective lens according to Example 2 of the invention; FIGS. 11(A)-11(D) show the spherical aberration, astigmatism, distortion, and lateral color, respectively;

FIG. 12 is aberration diagrams showing various aberrations of the endoscope objective lens according to Example 3 of the invention; FIGS. 12(A)-12(D) show the spherical aberration, astigmatism, distortion, and lateral color, respectively;

FIG. 13 is aberration diagrams showing various aberrations of the endoscope objective lens according to Example 4 of the invention; FIGS. 13(A)-13(D) show the spherical aberration, astigmatism, distortion, and lateral color, respectively;

FIG. 15 shows lens data of the endoscope objective lens of Comparative Example for the invention;

FIGS. 16(A)-16(D) show the spherical aberration, astigmatism, distortion, and lateral color, respectively.

DETAILED DESCRIPTION OF THE EXEMPLARY EMBODIMENTS

Although the invention will be described below with reference to the exemplary embodiments thereof, the following exemplary embodiments and modifications do not restrict the invention.

According to one aspect of the invention, an endoscope objective lens includes a front-group divergent lens system, an aperture stop, and a rear-group convergent lens system in this order from the object side, and the back focal length of the whole system (i.e., the objective lens) is longer than 2.5 times the combined focal length of the whole system. Since the cemented lens is disposed as an optical member for correction of lateral color at the image-side end of the rear-group convergent lens system and the formula (1) is satisfied for the cemented lens, the lateral color can be corrected for satisfactorily while the back focal length is made long enough to allow an optical path-changing prism to be inserted on the image side.

Exemplary embodiments of the present invention will be hereinafter described in detail with reference to the drawings.

Figure 1:
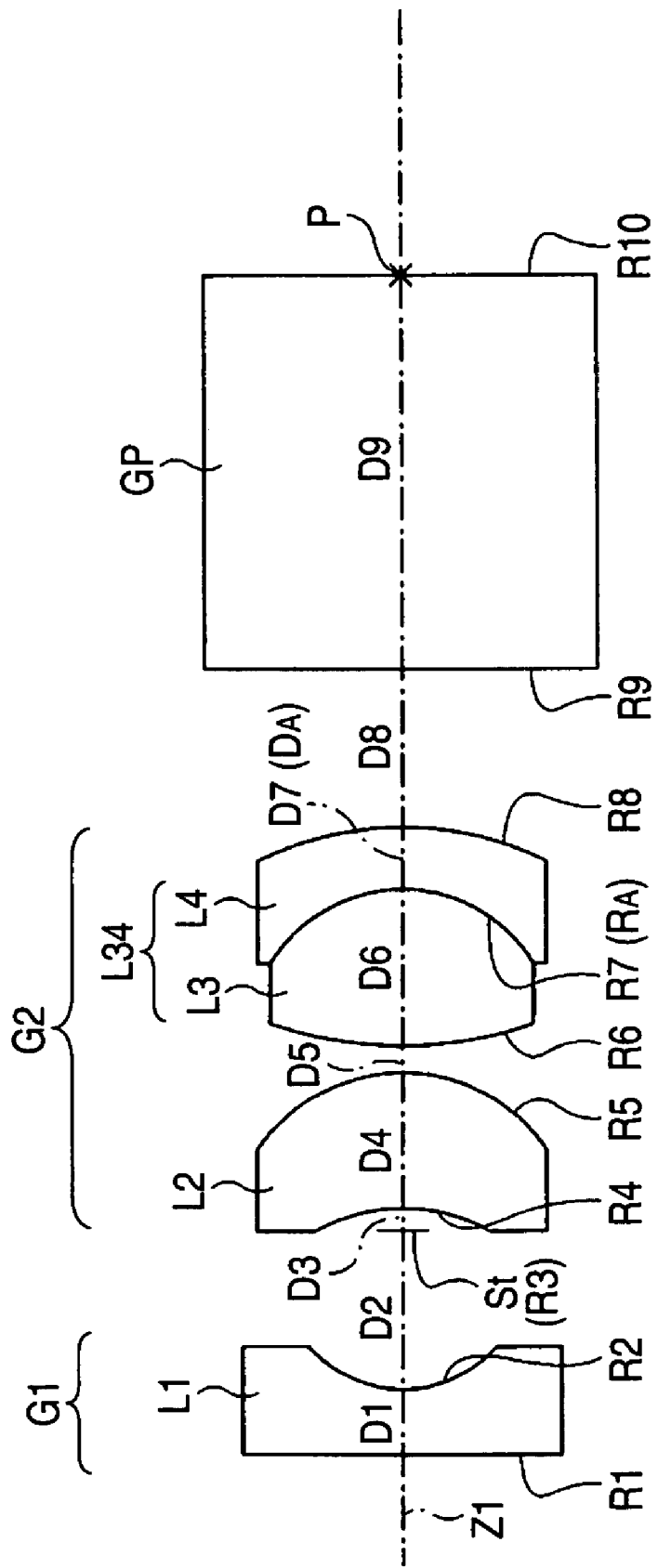
FIG. 1 is a sectional view of an endoscope objective lens according to Example 1 of the invention.
Figure 2:
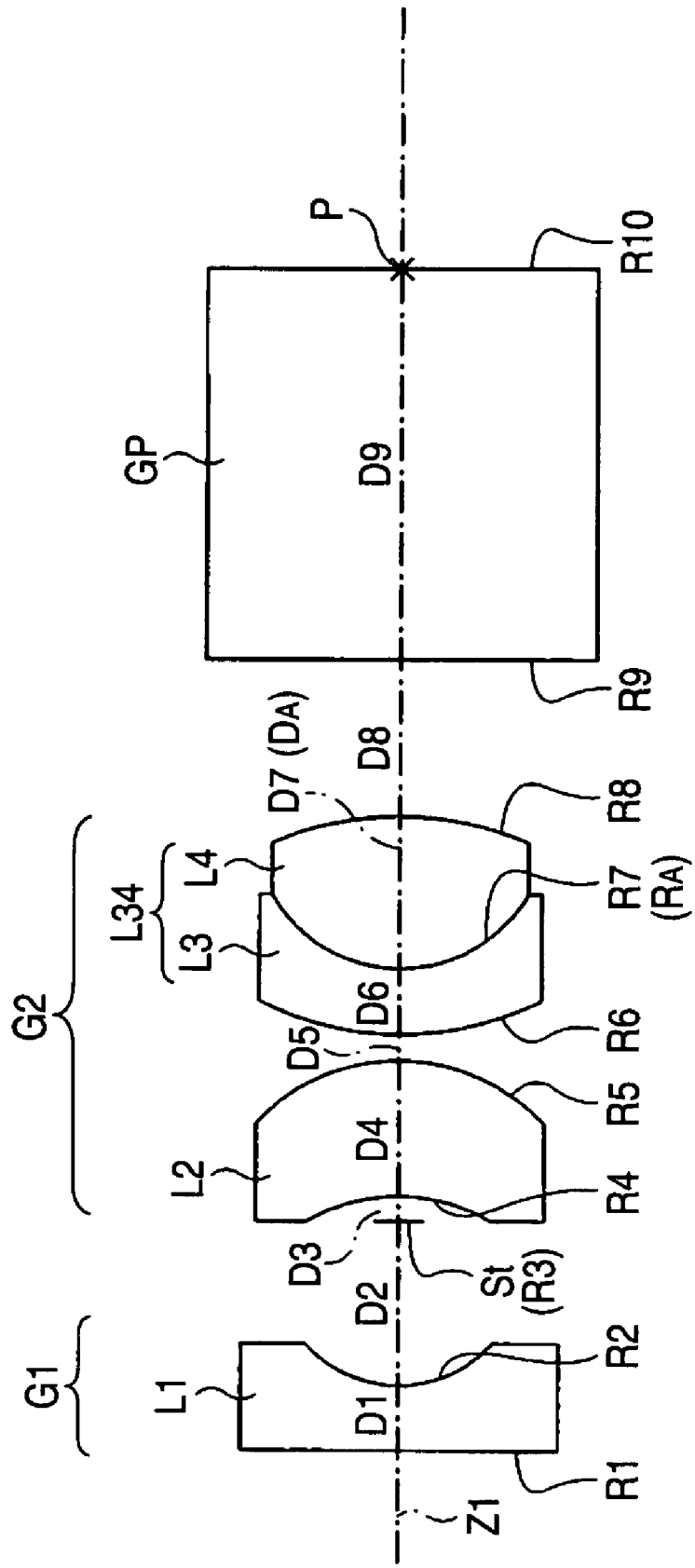
FIG. 2 is a sectional view of an endoscope objective lens according to Example 2 of the invention.
Figure 3:
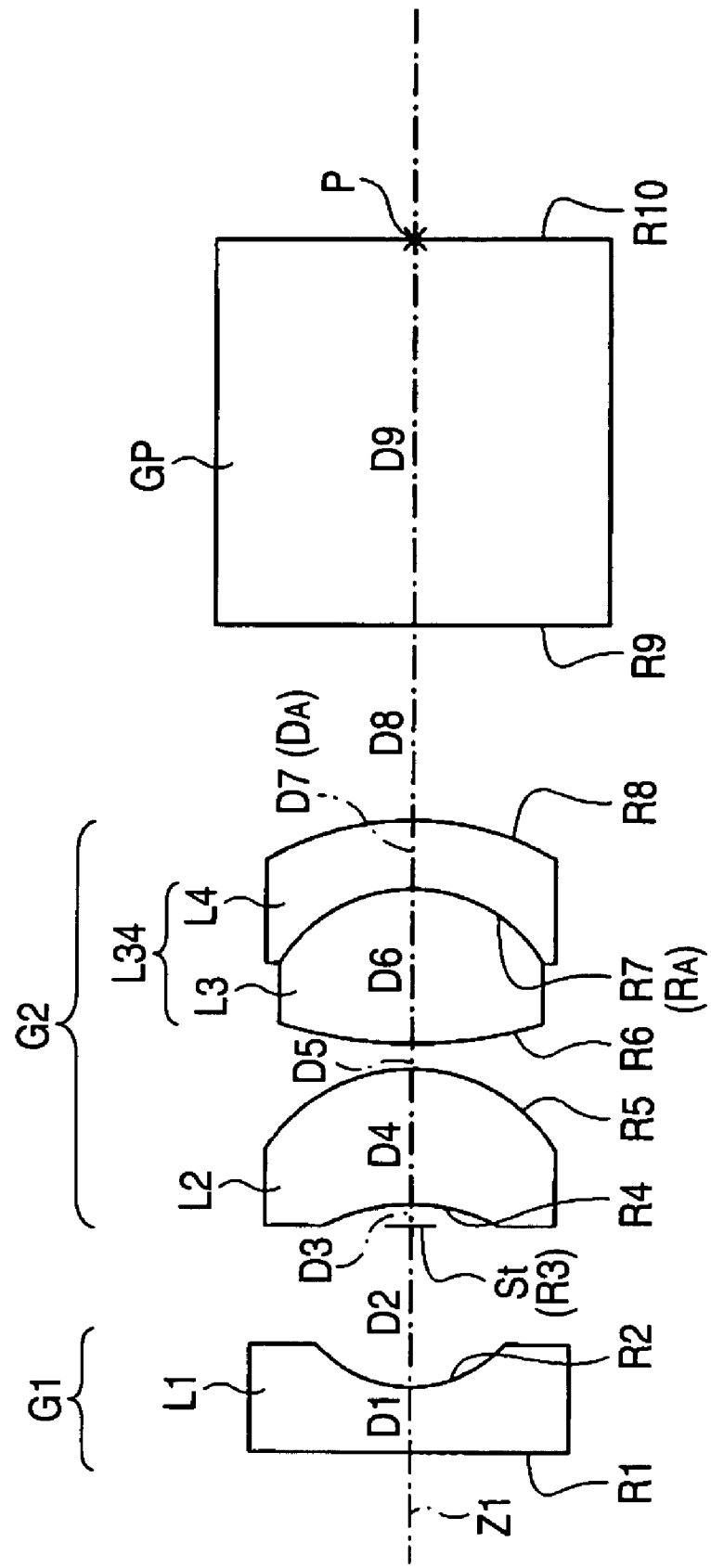
FIG. 3 is a sectional view of an endoscope objective lens according to Example 3 of the invention.
Figure 4:
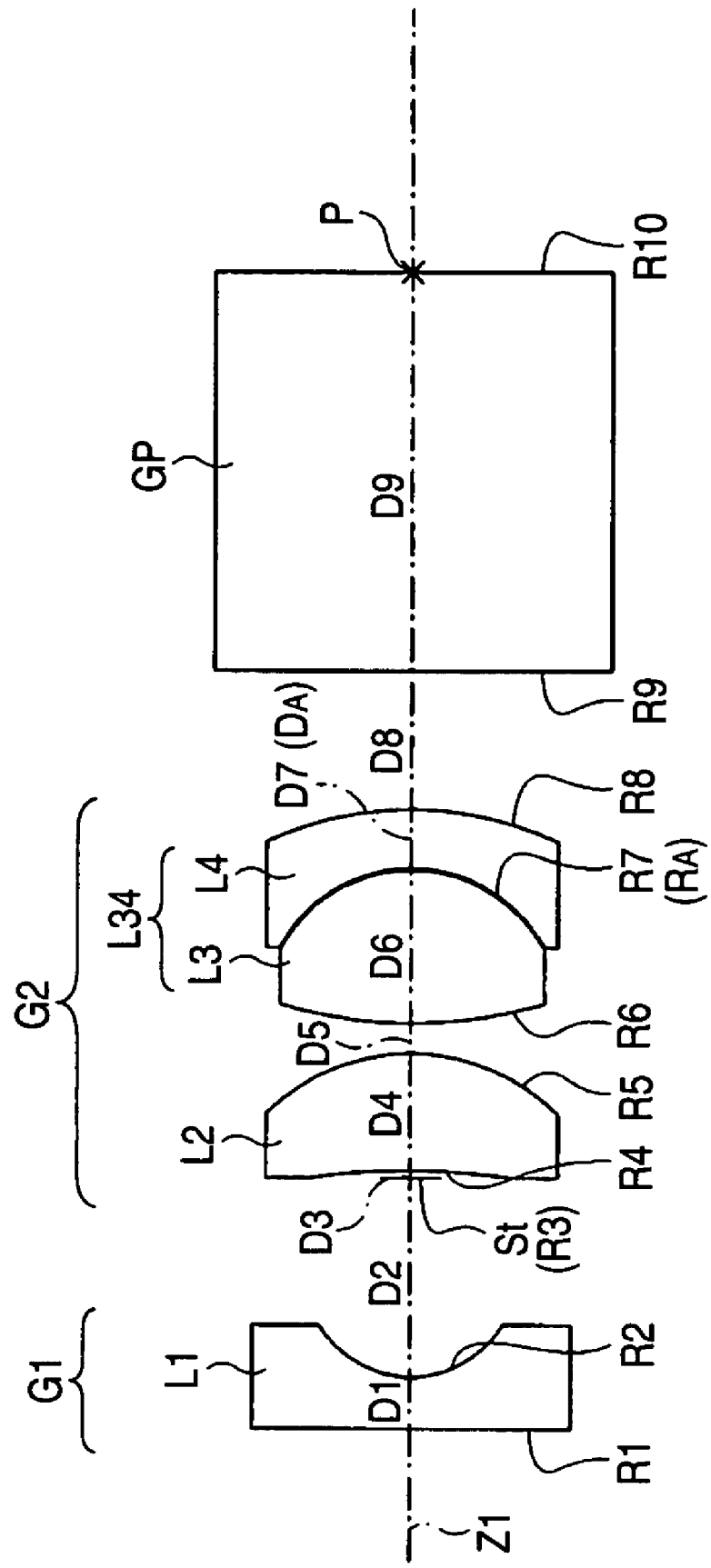
FIG. 4 is a sectional view of an endoscope objective lens according to Example 4 of the invention.

FIG. 1 shows a first exemplary configuration of an endoscope objective lens according to a first embodiment of the invention. This exemplary configuration corresponds to a lens configuration of Example 1 (described later; FIG. 5). FIG. 2 shows a second exemplary configuration which corresponds to a lens configuration of Example 2 (described later; FIG. 6). FIG. 3 shows a third exemplary configuration which corresponds to a lens configuration of Example 3 (described later; FIG. 7). FIG. 4 shows a fourth exemplary configuration which corresponds to a lens configuration of Example 4 (described later; FIG. 8). In FIGS. 1-4, symbol Ri represents the radius of curvature of the ith surface as numbered from the object side to the image side (image forming-surface side), the radius of curvature of the object-side end element surface being represented by R1. Symbol Di represents the surface interval on the optical axis Z1 between the ith surface and the (i+1)th surface. The above exemplary configurations have the same basic configuration, and hence the following description will be made with the first exemplary configuration shown in FIG. 1 used as a basis.

Figure 17:
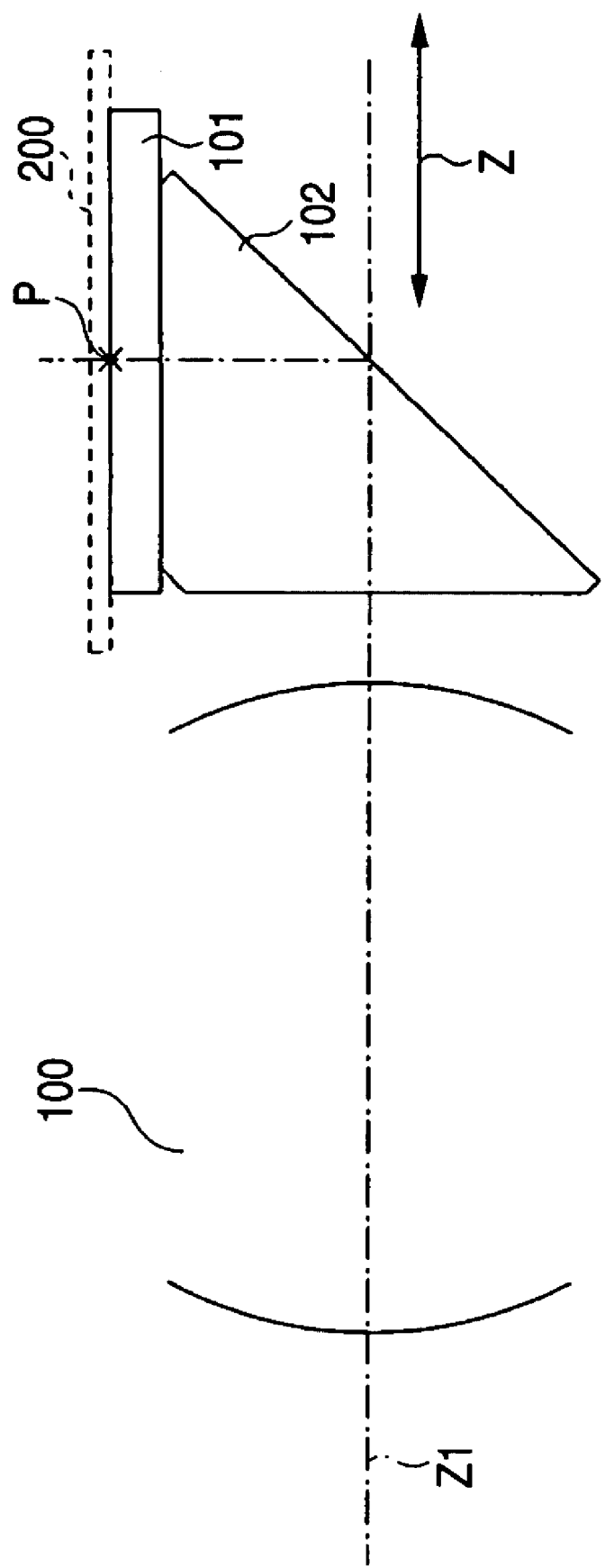
FIG. 17 outlines the configuration of an objective optical system of an endoscope in the related art.

This endoscope objective lens can be provided in the tip portion of an endoscope and, in particular, suitably used as an objective lens of an endoscope (see FIG. 17) in which a solid-state imaging device is disposed parallel with the axial direction (longitudinal direction). This endoscope objective lens is equipped with a front-group divergent lens system G1 having negative refractive power as a whole, an aperture stop St, and a rear-group convergent lens system G2 having positive refractive power as a whole which are arranged in this order from the object side along the optical axis Z1. An optical path-changing prism GP is disposed on the image side of the endoscope objective lens, and a solid-state imaging device such as a CCD is disposed close to the image-side surface of the optical path-changing prism GP. Another optical member such as a cover glass may be disposed between the optical path-changing prism GP and the solid-state imaging device. In FIGS. 1-4, numeral P denotes an image forming position. Although FIGS. 1-4 are drawn in such a manner that the optical path-changing prism GP is developed equivalently in the same direction as the incidence optical axis Z1 direction and the image forming position P is located on the incidence optical axis Z1, actually the optical path is bent by the optical path changing prism GP by about 90° as in the exemplary configuration of FIG. 17.

The front-group divergent lens system G1 includes a first lens L1, and the rear-group convergent lens system G2 includes a second lens L2 and a cemented lens L34 which are arranged in this order from the object side. The cemented lens L34 includes a third lens L3 and a fourth lens L4. As such, as a whole, the endoscope objective lens has a 3-group/4-lens configuration.

The first lens L1 is a negative lens whose surface having a smaller radius of curvature is located on the image side. For example, the first lens L1 is a plano-concave lens in which the object-side surface is a flat surface and the image-side surface is a concave surface. The second lens L2 is a positive meniscus lens whose convex surface is located on the image side. In the cemented lens L34, one of the third lens L3 and the fourth lens L4 is a positive lens and the other is a negative lens. In the first, third, and fourth exemplary configurations shown in FIGS. 1, 3, and 4, the third lens L3 is a positive, double convex lens and the fourth lens L4 is a negative meniscus lens whose concave surface is located on the object side. In the second exemplary configuration shown in FIG. 2, the third lens L3 is a negative meniscus lens whose concave surface is located on the image side and the fourth lens L4 is a positive, double convex lens.

In this endoscope objective lens, the back focal length Bf of the whole system is longer than 2.5 times the combined focal length f of the whole system and the formula (1) below is satisfied.

$$|v_3 - v_4| \times f^2 / \{|R_4| \cdot (Bf + D_4/n_4)\} \geq 9 \tag{1}$$

where $v_3$ is the Abbe number of the third lens L3, $v_4$ is the Abbe number of the fourth lens, $R_4$ is the radius of curvature of the interface between the third lens L3 and the fourth lens L4, $D_4$ is the center thickness of the fourth lens L4, and $n_4$ is the refractive index of the fourth lens L4.

In this endoscope objective lens, it is preferable that the Abbe number $v_-$ of the negative lens of the cemented lens L34 satisfy the following formula:

$$v_- < 22 \tag{2}$$

Next, workings and advantages of the above-configured endoscope objective lens will be described.

This endoscope objective lens is a lens system in which the front-group divergent lens system G1, the aperture stop St, and the rear-group convergent lens system G2 are arranged in this order from the object side and the back focal length Bf of the whole system is longer than 2.5 times the combined focal length f of the whole system. Since the cemented lens L34 is disposed as an optical member for correction of lateral color at a position that is distant from the aperture stop St and the formula (1) is satisfied for the cemented lens L34, the lateral color is corrected for satisfactorily while the back focal length Bf is made long enough to allow the optical path-changing prism GP to be inserted on the image side. The formula (1) relates to the degree of lateral color correction by the cemented lens L34 as the optical member for correction of lateral color. The left side of the formula (1) is the difference $|v_3-v_4|$ between the Abbe numbers of the third lens L3 and the fourth lens L4 divided by the product, normalized by the square of the combined focal length f of the whole system, of the radius $R_A$ of curvature of the joining surface of the cemented lens L34 and the value $(Bf+D_A/n_4)$ which is the back focal length Bf of the whole system plus the air-converted length $D_A/n_4$ of the fourth lens L4. The formula (1) means that a large difference $|v_3-v_4|$ between the Abbe numbers of the third lens L3 and the fourth lens L4 or a small radius $R_A$ of curvature of the interface is advantageous for the correction of lateral color.

In an image forming lens that is insufficient in the correction of chromatic aberration, both of the longitudinal chromatic aberration and the lateral color at shorter wavelengths are usually on the minus (under) side of those at a reference wavelength because a shorter-wavelength focal length is shorter than a longer-wavelength one. To correct for undercorrected lateral color, it is preferable to increase the Abbe number of a positive lens located downstream of the aperture stop St or decrease the Abbe number of a negative lens thus located. Therefore, it is preferable to decrease the Abbe number of the negative lens of the cemented lens L34 so that the formula (2) is satisfied. This further facilitates the correction of lateral color.

As described above, the endoscope objective lens according to the embodiment is a lens system in which the front-group divergent lens system G1, the aperture stop St, and the rear-group convergent lens system G2 are arranged in this order from the object side and the back focal length Bf of the whole system is longer than 2.5 times the combined focal length f of the whole system. Since the cemented lens L34 is disposed as an optical member for correction of lateral color at the image-side end of the rear-group convergent lens system G2 and the formula (1) is satisfied for the cemented lens L34, the lateral color is corrected for satisfactorily while the back focal length Bf is made long enough to allow the optical path-changing prism GP to be inserted on the image side.

The endoscope objective lens according to the embodiment is described above as a lens system in which the back focal length Bf of the whole system is longer than 2.5 times the combined focal length f of the whole system. A larger optical path-changing prism GP can be inserted as the back focal length Bf increases. In this case, the prism size can be increased with respect to an effective light beam, which is advantageous for suppression of a ghost or flare. Where the prism size is not increased, another advantage is obtained that a sufficient interval can be secured between the last lens and the optical path-changing prism GP and hence a filter, for example, can be inserted easily when necessary. To fully enjoy these advantages, it is desirable that the back focal length Bf of the whole system be 3 times or more longer than the combined focal length f of the whole system.

EXAMPLES

Next, specific examples of the endoscope objective lens according to the embodiment will be described. Examples 1-4 will be described together below.

FIG. 5 shows lens data of the endoscope objective lens according to Example 1. The basic lens configuration of the endoscope objective lens according to Example 1 has already been described above with reference to FIG. 1. In the column "surface Si" of the lens data shown in FIG. 5, symbol Si denotes the ith surface (i=1 to 10) as numbered from the object side to the image side, the object-side end element surface being denoted by S1. In the column "radius Ri of curvature," the value (mm) of the radius of curvature of the ith surface as numbered from the object side is shown (symbol Ri is the same as shown in FIG. 1). In the column "surface interval Di," the value (mm) of the surface interval on the optical axis Z1 between the ith surface Si and the (i+1)th surface Si+1 is shown. In the column "refractive index ndj," the value of the refractive index at the d-line (wavelength: 587.6 nm) of the portion between adjoining lens surfaces is shown. In the column "Abbe number vdj," the value of the Abbe number at the d-line of the jth optical element (j=1 to 5) as numbered from the object side is shown. The numerical values of the radius Ri of curvature and the surface interval Di are normalized so that the combined focal length f of the whole system becomes 0.5 mm.

FIG. 6 shows lens data of the endoscope objective lens according to Example 2 in the same manner as in the case of the endoscope objective lens according to Example 1. The basic lens configuration of the endoscope objective lens according to Example 2 has already been described above with reference to FIG. 2. Likewise, FIG. 7 shows lens data of the endoscope objective lens according to Example 3. The basic lens configuration of the endoscope objective lens according to Example 3 has already been described above with reference to FIG. 3. FIG. 8 shows lens data of the endoscope objective lens according to Example 4. The basic lens configuration of the endoscope objective lens according to Example 4 has already been described above with reference to FIG. 4. In Examples 2-4, as in the case of Example 1, the numerical values of the radius Ri of curvature and the surface interval Di are normalized so that the combined focal length f of the whole system becomes 0.5 mm.

FIG. 9 shows other various data of the objective lens of each Example, that is, the image size, the distance to the object, the angle of view, the back focal length Bf, the value of lateral color ((F-line value)–(C-line value)) at the maximum angle of view, and the values of the left sides of the formulae (1) and (2). The C-line and the F-line have wavelengths 656.27 nm and 486.13 nm, respectively. As seen from FIG. 9, each Example satisfies the formulae (1) and (2). Furthermore, in each Example, the back focal length Bf of the whole system is longer than 2.5 times the combined focal length f of the whole system. In particular, in Examples 1-3, the back focal length Bf of the whole system is longer than 3 times the combined focal length f of the whole system. The values of the parameters $v_3$, $v_4$, $v_-$, and $n_4$ used in calculating the values of the left sides of the formulae (1) and (2) are ones obtained when the d-line is used as a reference wavelength.

Figure 14:
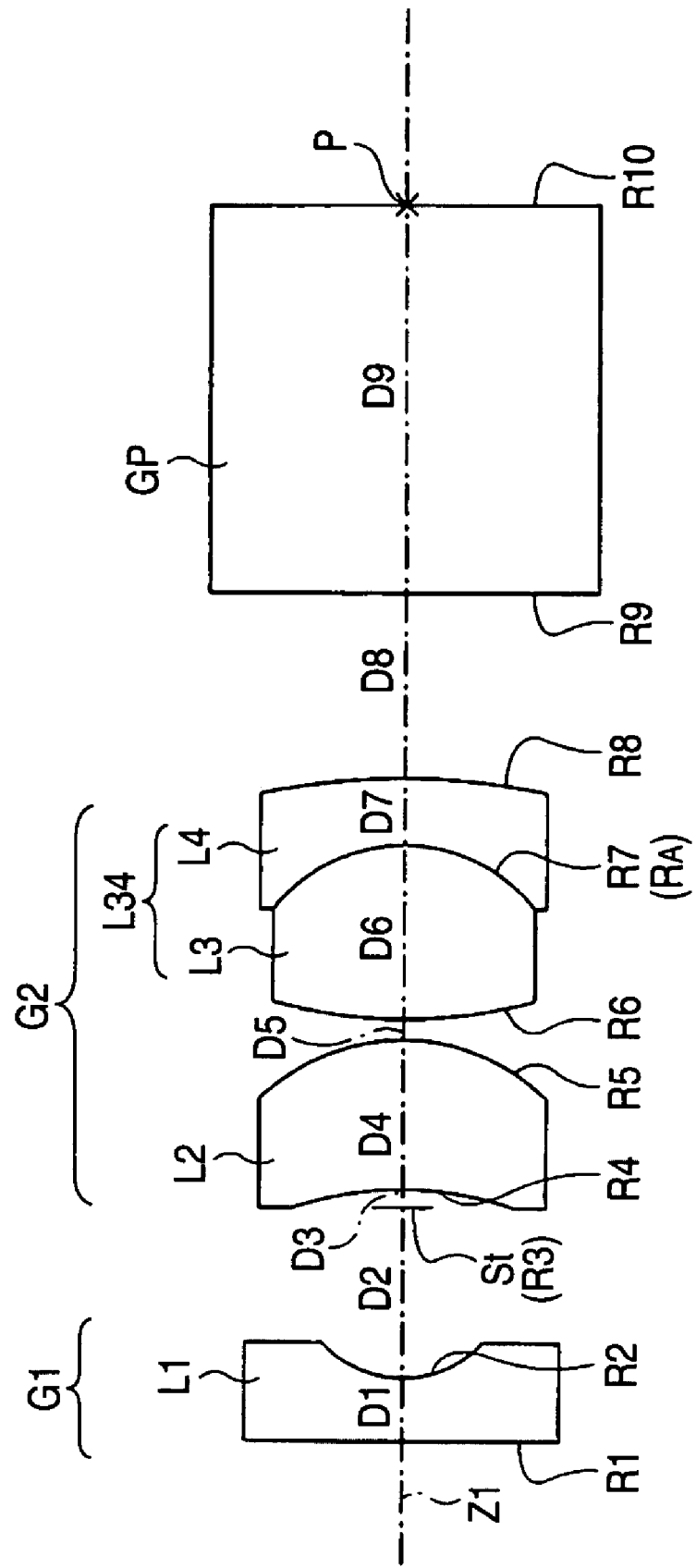
FIG. 14 is a sectional view of an endoscope objective lens of Comparative Example for the invention.
Figure 16:
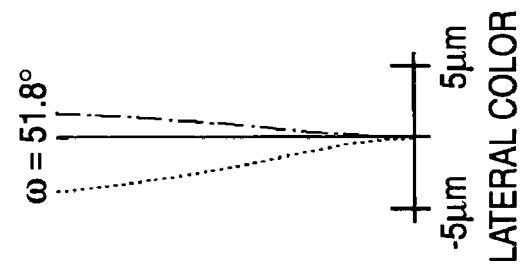
FIG. 16 is aberration diagrams showing various aberrations of the endoscope objective lens of Comparative Example for the invention.
Figure 16:
Figure 16:
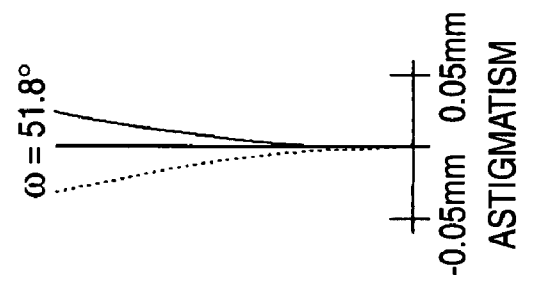
Figure 16:
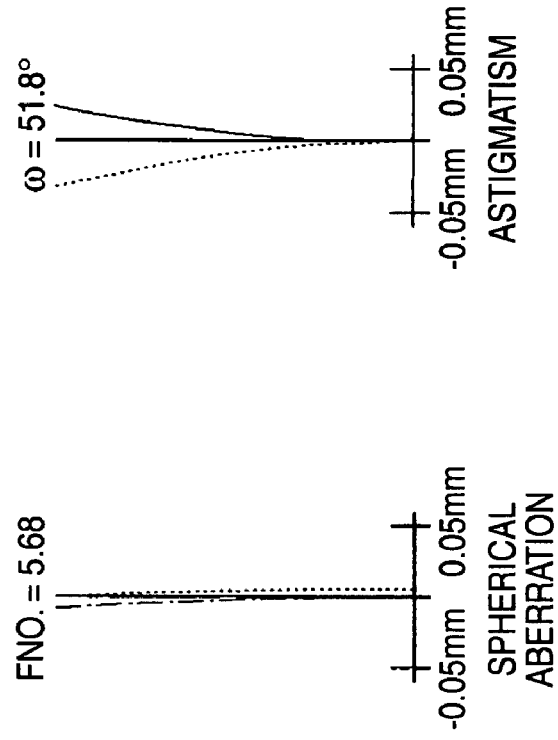

FIG. 9 also shows the values of the same parameters of an endoscope objective lens of Comparative Example for comparison with the endoscope objective lens according to the embodiment. The endoscope objective lens of Comparative Example satisfies neither of the formulae (1) and (2), and the value of its lateral color is larger than the corresponding values of the respective Examples. FIG. 14 shows the configuration of the endoscope objective lens of Comparative Example, and FIG. 15 shows its lens data. The same symbols as used for denoting or representing the corresponding portions and parameters of the endoscope objective lens according to each Example are used in FIGS. 14 and 15. The endoscope objective lens of Comparative Example is the one described as Example 2 in JP-A-2005-148508. Also in Comparative Example, the numerical values of the radius Ri of curvature and the surface interval Di are normalized so that the combined focal length f of the whole system becomes 0.5 mm.

FIGS. 10(A)-10(D) show the spherical aberration, astigmatism, distortion, and lateral color, respectively, of the endoscope objective lens according to Example 1. Each aberration diagram shows an aberration curve(s) at the d-line used as a reference wavelength. The spherical aberration diagram also shows aberration curves at the C-line and the F-line. The lateral color diagram shows aberration curves at the C-line and the F-line. Symbol FNO. means the F number and parameter ω represents the half angle of view.

Likewise, FIGS. 11(A)-11(D) show the aberrations of the endoscope objective lens according to Example 2, FIGS. 12(A)-12(D) show the aberrations of the endoscope objective lens according to Example 3, and FIGS. 13(A)-13(D) show the aberrations of the endoscope objective lens according to Example 4. Furthermore, FIGS. 16(A)-16(D) show the aberrations of the endoscope objective lens of Comparative Example of FIGS. 14 and 15.

As seen from the above numerical data and aberration diagrams, in each Example, the endoscope objective lens is realized in which the lateral color, in particular, is corrected for more properly than in the endoscope objective lens of Comparative Example.

The invention is not limited to the above embodiment and Examples and various modifications are possible. For example, the radii of curvature of the lens elements, the surface intervals, the refractive indices of the lens elements, etc. are not limited to the values used in the above numerical examples and may have other values.

This application claims foreign priority from Japanese Patent Application Nos. JP2006-36582 and JP2006-140242, filed Feb. 14, 2006 and May 19, 2006, respectively, the entire disclosure of which is herein incorporated by reference.

What is claimed is:

1. An objective lens comprising: in order from an object side of the objective lens,
   a front-group divergent lens system comprising a first lens, the first lens having a concave surface on an image side thereof;
   an aperture stop; and
   a rear-group convergent lens system comprising a second lens, a third lens and a fourth lens in this order from the object side, wherein the second lens is a positive meniscus lens having a convex surface on the image side thereof, the third and fourth lenses comprises a cemented lens, one of the third and fourth lenses is a positive lens, and the other of the third and fourth lenses is a negative lens,
   wherein
   the objective lens has a back focal length longer than 2.5 times a combined focal length of the objective lens, and the objective lens satisfies formula (1):

$$|v_3 - v_4| \times f^2 / \{|R_4| \cdot (Bf + D_4/n_4)\} \geqq 9$$

wherein
   f represents the combined focal length of the objective lens,
   Bf represents the back focal length of the objective lens,
   $v_3$ represents an Abbe number of the third lens,
   $v_4$ represents an Abbe number of the fourth lens,
   $R_4$ represents a radius of curvature of an interface between the third and fourth lenses,
   $D_4$ represents a center thickness of the fourth lens, and
   $n_4$ represents a refractive index of the fourth lens.

2. An objective lens comprising: in order from an object side of the objective lens,
   a front-group divergent lens system comprising a first lens, the first lens having a concave surface on an image side thereof
   an aperture stop; and
   a rear-group convergent lens system comprising a second lens, a third lens and a fourth lens in this order from the object side, wherein the second lens is a positive meniscus lens having a convex surface on the image side thereof, the third and fourth lenses comprises a cemented lens, one of the third and fourth lenses is a positive lens, and the other of the third and fourth lenses is a negative lens,
   wherein
   the objective lens has a back focal length longer than 2.5 times a combined focal length of the objective lens, and the objective lens satisfies formula (1):

$$|v_3 - v_4| \times f^2 / \{|R_4| \cdot (Bf + D_4/n_4)\} \geqq 9$$

wherein
   f represents the combined focal length of the objective lens,
   Bf represents the back focal length of the objective lens,
   $v_3$ represents an Abbe number of the third lens,
   $v_4$ represents an Abbe number of the fourth lens,
   $R_4$ represents a radius of curvature of an interface between the third and fourth lenses,
   $D_4$ represents a center thickness of the fourth lens, and
   $n_4$ represents a refractive index of the fourth lens; and
   the objective lens satisfies formula (2)

$$v\_ < 22$$

wherein v_ represents an Abbe number of the negative lens of the cemented lens.

* * * * *